(No Model.)
J. H. BURROWS.
NUT LOCK.
No. 517,728. Patented Apr. 3, 1894.
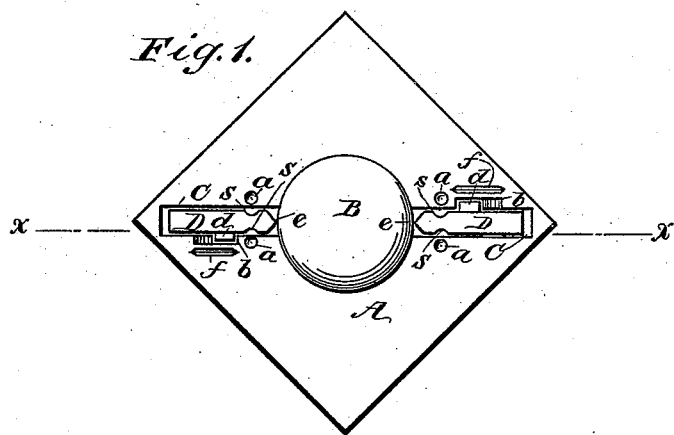
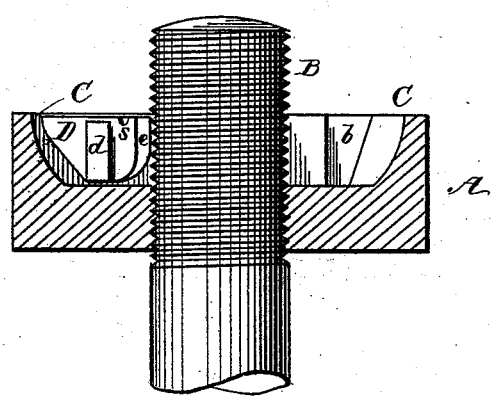 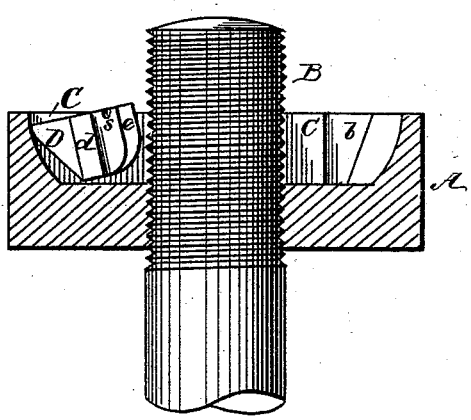
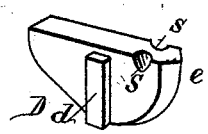
WITNESSES:
INVENTOR
J. H. Burrows
BY
Munn & Co
ATTORNEYS.

UNITED STATES PATENT OFFICE.

JOSEPH H. BURROWS, OF GLOBE, ARIZONA TERRITORY, ASSIGNOR TO GUSTAVUS HYMAN, OF SAN FRANCISCO, CALIFORNIA.

NUT-LOCK.

SPECIFICATION forming part of Letters Patent No. 517,728, dated April 3, 1894.

Application filed August 1, 1893. Serial No. 482,059. (No model.)

*To all whom it may concern:*

Be it known that I, JOSEPH HIRAM BURROWS, of Globe, in the county of Gila and Territory of Arizona, have invented a new and useful Improvement in Nut-Locks, of which the following is a full, clear, and exact description.

This invention is designed as an improvement upon the nut lock for which Letters Patent No. 256,971, were issued to me conjointly with Barnet E. Light, as part assignee, on April 25, 1882, and in which the nut of the bolt was made with one or more recesses in its face, adapted to receive loose keys or wedges sharpened on their one end and having their other end beveled inwardly from top to bottom, to dig or bite at their sharpened ends into the screw-threaded portion of the bolt when the nut was screwed home, for the purpose of locking the nut. But this invention differs therefrom in several important particulars, including the dispensing with a transverse rib or projection in the bottom of said recesses and with diverging recesses in the bottom of the keys forming a nose between them for engagement with said ridges or projections, and the invention consists in a novel construction of the recess or recesses in the nut and of the key or keys fitting the same, substantially as hereinafter described and pointed out in the claims, and for operation to lock and unlock the nut, as will be herein explained.

Reference is to be had to the accompanying drawings forming a part of this specification, in which similar letters of reference indicate corresponding parts in all the figures.

Figure 1 represents an outside face view of a nut as screwed on to a bolt, with my invention applied. Figs. 2 and 3 are views in direction of the length of the bolt, with the nut in section upon the line *x x* in Fig. 1, and showing respectively a locking key in position as when locking the nut on the bolt, and the same key in position as when canted to screw the nut on to the bolt or to unlock the nut from it; and Fig. 4 is a view in perspective of the key detached.

A, is the nut screwed on to the bolt B, and provided on its outside face portion with one or more recesses C, in approximate radial relation with the bolt hole in the nut, and opening at their inner ends into said hole. Each of these recesses C is enlarged on its one side, centrally or thereabout of its length, by the formation of a groove *b* in the nut, the groove being made widest at top and vanishing or tapering toward its bottom, and with its inner marginal wall straight and its outer marginal wall sloping to give to said groove the necessary taper.

D, is the key or wedge which fits freely within either of the recesses C, and which is provided with a lateral projection *d*, that fits down within the groove *b* of the recessed portion of the nut. This lateral projection *d* is made narrower than the groove *b* or so that it only fits the bottom of said groove, so as to give room for the canting of the key, which is suitably beveled or rounded at its front and back for the purpose and which is sharpened at its front end *e*, and said lateral projection *d* is constructed so that it does not quite come up to the top of the key, for a purpose that will be hereinafter explained. Said key also is or may be made with side notches *s* at its top in front, for the purpose of locking the key when the latter locks the nut as hereinafter described. The key D is kept in the recess C of the nut and prevented from working out therefrom, after it has been inserted to its place in the nut, by giving the nut a smart blow with a hammer, either directly or through the intervention of a punch, as for instance at *f*, which causes the metal of the nut next to the groove *b* to be spread or forced over the upper end of the lateral projection *d* of the key where it stops short of the top of the key.

To screw the nut on the bolt without interference by the key D, after the latter has been inserted to its place in the nut, I apply a punch to the outer end of the top of the key and give it a slight blow with a wrench or hammer. This cants the key as shown in Fig. 3, sufficiently to allow of the nut being screwed to its proper position on the bolt. Then, by placing the punch on the end of the key closer to the bolt and giving the punch a slight blow with the hammer, the key is canted in a reverse direction, or rather forced to a level position on its top as shown in Fig.

2, which will cause the sharpened inner end or nose *e* of the key to cut into the bolt, crosswise of the threads thereof, sufficiently deep to prevent the unscrewing of the nut. These operations may be repeated, with like results, as often as it is required to screw or unscrew the nut on to or from the bolt. If desired, after the key has been locked with the bolt, a punch may be applied, as at *a a* to the nut, and a sharp blow given it with the hammer, to force the metal of the nut into the notches *s* in the inner side end portions of the key, to further secure or hold the key in lock with the bolt.

Having thus described my invention, what I claim as new, and desire to secure by Letters Patent, is—

1. The combination, with the screw bolt, of the nut provided with one or more recesses in its outside face, opening into the bolt hole of the nut and enlarged on the side intermediately of the length of the recess to form a groove wider at top than bottom, and a key applied to said recess or recesses and constructed with a lateral projection adapted to fit within the groove, but of less width than said groove above the bottom thereof, and constructed to stop short of the top of the key, substantially as herein shown and described and for the purpose set forth.

2. In a nut lock, the combination, with the screw bolt B, of the nut A having one or more recesses C opening into the bolt-hole of the nut, and constructed to form an inwardly tapering lateral groove *b* intermediate of the length of each recess, and of the canting key or wedge D, constructed with a sharpened inner end *e*, and with a lateral projection *d* of less width than the groove *b* above the bottom thereof and made to stop short of the top of the key, essentially as shown and described and for the purposes specified.

JOSEPH H. BURROWS.

Witnesses:
W. W. BROOKWIN,
DAVID GLENN.